US008367790B2

(12) United States Patent
Maliverney et al.

(10) Patent No.: US 8,367,790 B2
(45) Date of Patent: Feb. 5, 2013

(54) RTV-ORGANOPOLYSILOXANE COMPOSITIONS AND NOVEL ORGANOPOLYSILOXANE POLYCONDENSATION CATALYSTS THEREFOR

(75) Inventors: Christian Maliverney, Saint Julien sur Bibost (FR); Delphine Blanc, Lyons (FR); Rachid Ferhat, Vienne (FR)

(73) Assignee: Bluestar Silicones France, Lyons (FR)

( * ) Notice: Subject to any disclaimer, the term of this patent is extended or adjusted under 35 U.S.C. 154(b) by 77 days.

(21) Appl. No.: 12/808,732

(22) PCT Filed: Dec. 18, 2008

(86) PCT No.: PCT/FR2008/001773
§ 371 (c)(1),
(2), (4) Date: Sep. 1, 2010

(87) PCT Pub. No.: WO2009/106723
PCT Pub. Date: Sep. 3, 2009

(65) Prior Publication Data
US 2010/0324213 A1    Dec. 23, 2010

(30) Foreign Application Priority Data
Dec. 20, 2007  (FR) ..................... 07 08919

(51) Int. Cl.
*C08G 77/08* (2006.01)
*C08L 83/00* (2006.01)

(52) U.S. Cl. .......................... 528/14; 524/588
(58) Field of Classification Search ............... 528/14
See application file for complete search history.

(56) References Cited

U.S. PATENT DOCUMENTS

| | | | | | |
|---|---|---|---|---|---|
| 3,453,300 | A | * | 7/1969 | Backus et al. | 556/40 |
| 4,100,129 | A | * | 7/1978 | Beers | 524/425 |
| 5,055,502 | A | * | 10/1991 | Frances et al. | 524/780 |
| 5,246,979 | A | * | 9/1993 | Lutz et al. | 522/42 |
| 5,770,672 | A | * | 6/1998 | Gitlitz et al. | 528/58 |
| 5,962,583 | A | * | 10/1999 | Beljanski et al. | 524/779 |
| 5,998,560 | A | * | 12/1999 | Decker et al. | 528/14 |
| 6,506,498 | B2 | * | 1/2003 | Decker et al. | 428/447 |
| 7,504,468 | B2 | | 3/2009 | Guennouni et al. | |
| 2007/0173624 | A1 | * | 7/2007 | Chaussade et al. | 528/14 |
| 2007/0191541 | A1 | * | 8/2007 | Guennouni et al. | 524/731 |
| 2008/0146695 | A1 | * | 6/2008 | Nefzger et al. | 523/109 |
| 2009/0298982 | A1 | * | 12/2009 | Meyer et al. | 524/268 |

FOREIGN PATENT DOCUMENTS

| | | |
|---|---|---|
| FR | 2856694 A1 | 12/2004 |
| GB | 2270522 A | 3/1994 |

* cited by examiner

*Primary Examiner* — Robert S Loewe
(74) *Attorney, Agent, or Firm* — SNR Denton US LLP

(57) ABSTRACT

RTV-organopolysiloxane compositions are crosslinkable by polycondensation and are devoid of alkyltin-based catalysts; novel organopolysiloxane polycondensation catalysts are useful therefor.

24 Claims, No Drawings

RTV-ORGANOPOLYSILOXANE COMPOSITIONS AND NOVEL ORGANOPOLYSILOXANE POLYCONDENSATION CATALYSTS THEREFOR

CROSS-REFERENCE TO PRIOR APPLICATIONS

This application claims priority under 35 U.S.C. §119 of FR 07/08919, filed Dec. 20, 2007, and is a continuation of PCT/FR 2008/001773, filed Dec. 18, 2008 and designating the United States (published in the French language on Sep. 3, 2009 as WO 2009/106723 A1; the title and abstract were also published in English), each hereby expressly incorporated by reference in its entirety and each assigned to the assignee hereof.

The present invention relates to an organopolysiloxane composition that can be vulcanized at room temperature into an elastomer that is crosslinked by polycondensation and that does not contain alkyltin-based catalysts which exhibit toxicity problems.

The invention also relates to novel polycondensation catalysts in silicone chemistry, and to the uses thereof as catalysts for the polycondensation reaction of organopolysiloxanes.

More particularly, the present invention targets compositions that are presented, before use, in the form of 2-component (RTV-2) compositions.

Elastomer formulations that crosslink via polycondensation generally involve a silicone oil, generally a polydimethylsiloxane, with hydroxyl end groups, optionally prefunctionalized by a silane so as to have alkoxy ends, a crosslinker, a polycondensation catalyst, conventionally a tin salt or an alkyl titanate, a reinforcing filler and other optional additives such as bulking fillers, adhesion promoters, colorants, biocidal agents, etc.

These room-temperature vulcanizing organopolysiloxane compositions are well known and are classified into 2 different groups: single-component compositions (RTV-2) and two-component compositions (RTV-1).

During crosslinking, water (either provided by atmospheric moisture in the case of RTV-1 compositions, or introduced into one part of the composition in the case of RTV-2 compositions) enables the polycondensation reaction, which results in the formation of the elastomeric network.

Generally, single-component (RTV-1) compositions crosslink when they are exposed to moisture from the air, that is to say that they cannot crosslink in an enclosed medium. For example, the single-component silicone compositions used as sealants or cold-setting adhesives follow a mechanism of hydrolysis of reactive functional groups of the acetoxysilane, ketiminoxysilane, alkoxysilane, etc. type, followed by condensation reactions between the silanol groups formed and other residual reactive functional groups. The hydrolysis is generally carried out by virtue of water vapor which diffuses into the material from the surface exposed to the atmosphere. Generally, the kinetics of the polycondensation reactions is extremely slow; these reactions are therefore catalyzed by a suitable catalyst. As catalysts which are used, use is most often made of catalysts based on tin, titanium, an amine or compositions of these catalysts. Catalysts based on tin (cf. in particular FR-A-2 557 582) and on titanium (cf. in particular FR-A-2 786 497) are catalysts that are very effective.

As regards two-component compositions, they are sold and stored in the form of two components, a first component containing the base polymer materials and the second component containing the catalyst. The two components are mixed at the moment of use and the mixture crosslinks in the form of a relatively hard elastomer. These two-component compositions are well known and are described, in particular, in the book by Walter Noll "Chemistry and Technology of Silicones" 1968, 2nd Edition, on pages 395 to 398. These compositions essentially comprise 4 different ingredients:

a reactive $\alpha,\omega$-dihydroxydiorganopolysiloxane polymer, a crosslinking agent, generally a silicate or a polysilicate, a tin catalyst, and water.

Usually, the condensation catalyst is based on an organic tin compound. Indeed, many tin-based catalysts have already been proposed as crosslinking catalysts for these RTV-2 compositions. The most widely used compounds are alkyltin carboxylates such as tributyltin monooleate or dialkyltin dicarboxylates such as dibutyltin dilaurate, dibutyltin diacetate or dimethyltin dilaurate (see the book by Noll "Chemistry and Technology of silicones" page 337, Academic Press, 1968—$2^{nd}$ Edition or patents EP 147 323 or EP 235 049).

However, the alkyltin-based catalysts, although very effective, usually colorless, liquid and soluble in silicone oils, have the drawback of being toxic (CMR2 toxic for reproduction).

Titanium-based catalysts, also widely used in RTV-1 compositions, have however a major drawback: they have slower kinetics than tin-based catalysts. Furthermore, these catalysts cannot be used in RTV-2 compositions due to gelling problems.

Other catalysts are sometimes mentioned, such as catalysts based on zinc, zirconium or aluminum, but they have only experienced minor industrial development due to their mediocre effectiveness.

For sustainable development, it therefore appears necessary to develop nontoxic catalysts for the polycondensation reaction of organopolysiloxanes.

Another important aspect for a catalyst of the polycondensation reaction of organopolysiloxanes is the pot life, that is to say the time during which the composition can be used after mixing without curing. This time must be long enough to allow it to be used, but short enough to obtain a molded article that can be handled at the latest a few minutes or a few hours after it has been manufactured. The catalyst must thus make it possible to obtain a good compromise between the pot life of the catalyzed mixture and the time at the end of which the molded article can be handled (these times depend on the targeted application such as, for example, the molding or manufacture of seals). In addition, the catalyst must confer, on the catalyzed mixture, a spreading time which does not vary as a function of the storage time.

The main objective of the present invention is therefore to find a catalyst system that can be used both in the crosslinking of single-component and two-component elastomer compositions.

Another main objective of the present invention is to propose a catalyst system that continues to simultaneously meet the constraints of storage, of processing and of crosslinking of the two types of single-component and two-component elastomer compositions.

An organopolysiloxane composition has now been found, and it is this which constitutes the subject of the present invention, characterized in that the organopolysiloxane composition comprises, on the one hand, a silicone base B capable of curing via polycondensation reaction into a silicone elastomer and, on the other hand, a catalytically effective amount of at least one catalyst system X, characterized in that:

a) the catalyst system X comprises at least one metal complex or salt A of formula (1) below:

$$[Zn(L^1)_{r1}(L^2)_{r2}(Y)_x] \quad (1)$$

in which:
r1=1 or 2, r2=0 or 1 and x=0 or 1;
the symbol $L^1$ represents a ligand which is a β-dicarbonylato anion or the enolate anion of a β-dicarbonyl-containing compound and, when r1=2, the symbols $L^1$ are identical or different,
the symbol $L^2$ represents an anionic ligand which is different from $L^1$ and
the symbol Y represents a neutral ligand, and b) the catalyst system X is prepared according to the following process:
step 1: the metal complex or salt A is dispersed in at least one oily organopolysiloxane polymer K, the viscosity of which is at least 100 mPa·s, preferably at least 5000 mPa·s and more preferably still at least 10 000 mPa·s, and
step 2: the mixture is milled, optionally after kneading, until a homogeneous mixture is obtained, which is the catalyst system X.

The definition "metal complex or salt A" is understood to include any oligomeric form or analogue of said metal complex or salt A.

In order to achieve this objective, the inventors have had the credit of demonstrating, quite surprisingly and unexpectedly, that the use of a catalyst system X that is based on zinc and is prepared according to an original process makes it possible to use a metal complex or salt A of formula (1) described above as a catalyst for the polycondensation reaction.

It is also to the credit of the inventors that they have overcome the technical prejudice that hitherto decreed that zinc complexes which are in a solid form have only a mediocre activity in the polycondensation reaction of organopolysiloxanes and likewise that the use of a catalyst in solid form and that is insoluble in a silicone medium was of no interest for a person skilled in the art.

The composition according to the invention makes it possible to obtain elastomers which retain good mechanical properties after a heat treatment, in particular after a heat treatment of 150° C. or 220° C. over 3 days. Thus, even after this heat treatment the Shore A hardness of the elastomer remains constant.

It should be noted that the definition of the ligands is taken from the book "Chimie Organométallique" [Organometallic Chemistry] by Didier Astruc, published in 2000 by EDP Sciences, cf., in particular, Chapter 1, "Les complexes monométalliques" [Single metal complexes], pages 31 et seq.

The nature of the neutral ligand Y is not very important and a person skilled in the art will use any type of neutral ligand suitable for the metal in question.

In order to explain in a little more detail the nature of the constituent elements of the invention, it is important to specify that any conventional mixing apparatus can be used, especially slow-stirring apparatus. Thus, the mixing operation can be carried out in a mixer equipped with an agitator. By way of example, mention may be made of single-screw or multiple-screw extruders, planetary mixers, hook mixers, slow dispersers, static mixers, paddle, propeller, arm or anchor mixers.

Any oily organopolysiloxane polymer K, the viscosity of which is at least 100 mPa·s, preferably at least 5000 mPa·s and more preferably still at least 10 000 mPa·s is suitable for the implementation of the invention.

According to one particularly advantageous embodiment, the milling is carried out by means of a 3-roll mill, for which the clamping pressures between the rolls are adjusted so as to result in a homogeneous mixture.

In order to carry out the invention, use is preferably made of a metal complex or salt A of formula (2) below:

$$[Zn(L^1)_{r1}(L^2)_{r2}] \quad (2)$$

in which:
r1=1 or 2 and r2=0 or 1; where r1+r2=2;
the symbol $L^1$ represents a ligand which is a β-dicarbonylato anion or the enolate anion of a β-dicarbonyl-containing compound and, when r1=2, the symbols $L^1$ are identical or different, and
the symbol $L^2$ represents an anionic ligand which is different from $L^1$.

It should be noted that at least one part of the inventive nature of the invention is due to the judicious and advantageous selection of the defined associations of metal compounds A used as polycondensation catalyst.

According to one preferred embodiment of the invention, the metal complex or salt A is chosen from the group constituted by the complexes of formulae (3) to (6) below:

$$[Zn(t\text{-}Bu\text{-}acac)_2] \text{ where (t-Bu-acac)=the 2,2,6,6-tet-} \\ \text{ramethyl-3,5-heptanedionato anion or the enolate} \\ \text{anion of 2,2,6,6-tetramethyl-3,5-heptanedione;} \quad (3)$$

$$[Zn(2,4\text{-pentanedionato})_2]; \quad (4)$$

$$[Zn(3,5\text{-heptanedionato})_2]; \text{and} \quad (5)$$

$$[Zn(2,6\text{-dimethyl-3,5heptanedionato})_2]. \quad (6)$$

According to another preferred embodiment of the invention, the β-dicarbonylato ligand $L^1$ is a β-diketonato anion derived from a β-diketone or a β-ketoesterato anion derived from a β-keto ester of the following formula:

$$R^1COCHR^2COR^3 \quad (7)$$

in which:
$R^1$ represents a substituted or unsubstituted, linear or branched $C_1$-$C_{30}$ hydrocarbon-based radical or a substituted or unsubstituted aromatic,
$R^2$ is a hydrogen or a hydrocarbon-based, in general alkyl, radical advantageously having at most 4 carbon atoms;
$R^3$ represents a substituted or unsubstituted, linear, cyclic or branched $C_1$-$C_{30}$ hydrocarbon-based radical, a substituted or unsubstituted aromatic, or an —$OR^4$ radical where $R^4$ represents a substituted or unsubstituted, linear, cyclic or branched $C_1$-$C_{30}$ hydrocarbon-based radical, where
$R^1$ and $R^2$ may be joined together to form a ring, and
$R^2$ and $R^4$ may be joined together to form a ring.

Among the β-diketones of formula (7) that are particularly advantageous for the composition according to the invention, mention will be made of those chosen from the group constituted by the following β-diketones: 2,4-pentanedione (acac); 2,4-hexanedione; 2,4-heptanedione; 3,5-heptanedione; 3-ethyl-2,4-pentanedione; 5-methyl-2,4-hexanedione; 2,4-octanedione; 3,5-octanedione; 5,5-dimethyl-2,4-hexanedione; 6-methyl-2,4-heptanedione; 2,2-dimethyl-3,5-nonanedione; 2,6-dimethyl-3,5-heptanedione; 2-acetylcyclohexanone (Cy-acac); 2,2,6,6-tetramethyl-3,5-heptanedione (t-Bu-acac); 1,1,1,5,5,5-hexafluoro-2,4-pentanedione (F-acac); trifluoroacetylacetone; benzoylacetone; dibenzoylmethane; 3-methyl-2,4-pentadione; 3-acetyl-2-pentanone; 3-acetyl-2-hexanone; 3-acetyl-2-heptanone; 3-acetyl-5-methyl-2-hexanone; stearoyl benzoyl methane; octanoyl benzoyl methane; 4-t-butyl-4'-methoxydibenzoylmethane; 4,4'-dimethoxydibenzoylmethane and 4,4'-di-tert-butyldibenzoylmethane.

According to another preferred embodiment of the invention, the β-dicarbonylato ligand $L^1$ is a β-ketoesterato anion chosen from the group constituted by the anions derived from the following compounds: methyl, ethyl, n-propyl, isopropyl, n-butyl, sec-butyl, isobutyl, tert-butyl, isopentyl, n-hexyl, n-octyl, 1-methylheptyl, n-nonyl, n-decyl and n-dodecyl esters of acetylacetic acid or those described in patent application FR-A-1435882.

In order to explain in a little more detail the nature of the constituent elements of the metal complex A according to the invention, it is important to specify that $L^2$ is an anionic ligand which may be selected from the group constituted by the following anions: fluoro ($F^-$), chloro ($Cl^-$), triiodo($1^-$) ($I_3$)$^-$, difluorochlorato($1^-$) [$ClF_2$]$^-$, hexafluoroiodato($1^-$) [$IF_6$]$^-$, oxochlorato($1^-$) ($ClO$)$^-$, dioxochlorato($1^-$) ($ClO_2$)$^-$, trioxochlorato($1^-$) ($ClO_3$)$^-$, tetraoxochlorato($1^-$) ($ClO_4$)$^-$, hydroxo ($OH$)$^-$, mercapto ($SH$)$^-$, selanido ($SeH$)$^-$, hyperoxo ($O_2$)$^-$, ozonido ($O_3$)$^-$, hydroxo ($OH^-$), hydrodisulfido ($HS_2$)$^-$, methoxo ($CH_3O$)$^-$, ethoxo ($C_2H_5O$)$^-$, propoxido ($C_3H_7O$)$^-$, methylthio ($CH_3S$)$^-$, ethanethiolato ($C_2H_5S$)$^-$, 2-chloroethanolato ($C_2H_4ClO$)$^-$, phenoxido ($C_6H_5O$)$^-$, phenylthio ($C_6H_5S$)$^-$, 4-nitrophenolato [$C_6H_4(NO_2)O$]$^-$, formato ($HCO_2$)$^-$, acetato ($CH_3CO_2$)$^-$, propionato ($CH_3CH_2CO_2$)$^-$, nitrido ($N_3$)$^-$, cyano ($CN$)$^-$, cyanato ($NCO$)$^-$, thiocyanato ($NCS$)$^-$, selenocyanato ($NCSe$)$^-$, amido ($NH_2$)$^-$, phosphino ($PH_2$)$^-$, chloroazanido ($ClHN$)$^-$, dichloroazanido ($Cl_2N$)$^-$, [methanaminato($1^-$)] ($CH_3NH$)$^-$, diazenido ($HN=N$)$^-$, diazanido ($H_2N-NH$)$^-$, diphosphenido ($HP=P$)$^-$, phosphonito ($H_2PO$)$^-$, phosphinato ($H_2PO_2$)$^-$, carboxylato, enolato, amides, alkylato and arylato.

According to one particularly preferred embodiment, $L^2$ is an anionic ligand selected from the group constituted by the following anions: acetate, oxalate, propionate, butyrate, isobutyrate, diethylacetate, benzoate, 2-ethylhexanoate, stearate, methoxide, ethoxide, isopropoxide, tert-butoxide, tert-pentoxide, 8-hydroxyquinolinate, naphthenate and tropolonate.

The nature of the neutral ligand Y is not very important and a person skilled in the art will use any type of neutral ligand suitable for the metal in question.

The invention also relates to a catalyst system X, characterized in that:

a) the catalyst system X comprises at least one metal complex or salt A of formula (1) below:

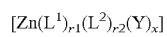 (1)

in which:
r1≧1, and r2=0 or 1 and x=0 or 1;

the symbol $L^1$ represents a ligand which is a β-dicarbonylato anion or the enolate anion of a β-dicarbonyl-containing compound and, when r1=2, the symbols $L^1$ are identical or different, the symbol $L^2$ represents an anionic ligand which is different from $L^1$, and the symbol Y represents a neutral ligand, and b) the catalyst system X is prepared according to the following process:

step 1: the metal complex or salt A is dispersed in at least one oily organopolysiloxane polymer K, the viscosity of which is at least 100 mPa·s, preferably at least 5000 mPa·s and more preferably still at least 10 000 mPa·s, and step 2: the mixture is milled, optionally after kneading, until a homogeneous mixture is obtained, which is the catalyst system X.

According to another preferred embodiment, the invention also relates to a catalyst system X as described above and characterized in that:

a) the catalyst system X comprises at least one metal complex or salt A of formula (2) below:

 (2)

in which:
r1=1 or 2 and r2=0 or 1; where r1+r2=2;

the symbol $L^1$ represents a ligand which is a β-dicarbonylato anion or the enolate anion of a β-dicarbonyl-containing compound and, when r1=2, the symbols $L^1$ are identical or different, and the symbol $L^2$ represents an anionic ligand which is different from $L^1$.

The amount of the catalyst system X according to the invention is adjusted by a person skilled in the art so that the metal complex or salt A is in an amount sufficient to meet the needs of the application. Generally, the metal complex or salt A will be present in the composition in amounts between 0.01 and 15%, and preferably between 0.05 and 10% by weight of the total mass of the composition.

Another subject of the invention consists of the use of a catalyst system X according to the invention and as defined above as a catalyst for the polycondensation reaction of organopolysiloxanes.

Description of the Silicone Base B:

The silicone bases used in the present invention that crosslink and cure via polycondensation reactions are well known. These bases are described in detail in particular in numerous patents and they are commercially available.

These silicone bases may be single-component bases, that is to say bases that are packaged in a single package, and stable during storage, in the absence of moisture, which can be cured in the presence of moisture, in particular moisture provided by the ambient air or by water generated within the base during the use thereof.

Apart from single-component bases, use may be made of two-component bases, that is to say bases that are packaged in two packages, which cure as soon as the catalyst system X according to the invention is incorporated. They are packaged, after incorporation of the catalyst, in two separate fractions, one of the fractions possibly containing, for example, only the catalyst according to the invention or a mixture with the crosslinking agent.

The silicone base B used to produce the composition according to the invention may comprise:
- at least one polyorganosiloxane oil C capable of crosslinking via polycondensation into an elastomer;
- optionally at least one crosslinking agent D;
- optionally at least one adhesion promoter E; and
- optionally at least one siliceous, organic and/or non-siliceous mineral filler F.

The polyorganosiloxane oil C is preferably an α,ω-dihydroxypolydiorganosiloxane polymer, with a viscosity between 50 and 5 000 000 mPa·s at 25° C. and the crosslinking agent D is preferably an organosilicon compound bearing more than two hydrolyzable groups bonded to the silicon atoms per molecule. The polyorganosiloxane oil C may also be functionalized at its ends by hydrolyzable radicals obtained by condensation of a precursor bearing hydroxyl functional groups with a crosslinking silane bearing hydrolyzable radicals.

As the crosslinking agent (D), mention may be made of:
silanes of the following general formula:

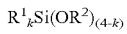

$R^1_k Si(OR^2)_{(4-k)}$ in which the symbols $R^2$, which are identical or different, represent alkyl radicals having from 1 to 8 carbon atoms, such as methyl, ethyl, propyl, butyl, pentyl or 2-ethylhexyl radicals, $C_3$-$C_6$ oxyalkylene radicals, the symbol $R^1$ represents a linear or branched, saturated or unsaturated, aliphatic hydrocarbon-based group, a saturated or unsaturated and/or aromatic, monocyclic or polycyclic carbocyclic group, and k is equal to 0, 1 or 2; and
the partial hydrolysis products of this silane.

As examples of $C_3$-$C_6$ alkoxyalkylene radicals, mention may be made of the following radicals:
CH$_3$OCH$_2$CH$_2$—
CH$_3$OCH$_2$CH(CH$_3$)—
CH$_3$OCH(CH$_3$)CH$_2$—
C$_2$H$_5$OCH$_2$CH$_2$CH$_2$—

The symbol $R^1$ represents a $C_1$-$C_{10}$ hydrocarbon-based radical that encompasses:
- $C_1$-$C_{10}$ alkyl radicals such as methyl, ethyl, propyl, butyl, pentyl, 2-ethylhexyl, octyl or decyl radicals;
- vinyl and allyl radicals; and
- $C_5$-$C_8$ cycloalkyl radicals such as phenyl, tolyl and xylyl radicals.

The crosslinking agents D are products that are available on the silicones market; furthermore, their use in room-temperature curing compositions is known; it occurs in particular in French patents FR-A-1 126 411, FR-A-1 179 969, FR-A-1 189 216, FR-A-1 198 749, FR-A-1 248 826, FR-A-1 314 649, FR-A-1 423 477, FR-A-1 432 799 and FR-A-2 067 636.

Preference is more particularly given, among the crosslinking agents D, to alkyltrialkoxysilanes, alkyl silicates and alkyl polysilicates, in which the organic radicals are alkyl radicals having from 1 to 4 carbon atoms.

As other examples of crosslinking agents D that may be used, mention is more particularly made of the following silanes:
propyltrimethoxysilane;
methyltrimethoxysilane;
ethyltrimethoxysilane;
vinyltriethoxysilane;
methyltriethoxysilane;
vinyltriethoxysilane;
propyltriethoxysilane;
tetraethoxysilane;
tetrapropoxysilane;
1,2-bis(trimethoxysilyl)ethane;
1,2-bis(triethoxysilyl)ethane; and
tetraisopropoxysilane,
or else: CH$_3$Si(OCH$_3$)$_3$; C$_2$H$_5$Si(OC$_2$H$_5$)$_3$; C$_2$H$_5$Si(OCH$_3$)$_3$CH$_2$=CHSi(OCH$_3$)$_3$; CH$_2$=CHSi(OCH$_2$CH$_2$OCH$_3$)$_3$C$_6$H$_5$Si(OCH$_3$)$_3$; [CH$_3$][OCH(CH$_3$)CH$_2$OCH$_3$]Si[OCH$_3$]$_2$Si(OCH$_3$)$_4$; Si(OC$_2$H$_5$)$_4$; Si(OCH$_2$CH$_2$CH$_3$)$_4$; Si(OCH$_2$CH$_2$CH$_2$CH$_3$)$_4$Si(OC$_2$H$_4$OCH$_3$)$_4$; CH$_3$Si(OC$_2$H$_4$OCH$_3$)$_3$; ClCH$_2$Si(OC$_2$H$_5$)$_3$.

As other examples of crosslinking agent D, mention may be made of ethyl polysilicate or n-propyl polysilicate.

Use is generally made of 0.01 to 60 parts by weight of crosslinking agent D per 100 parts by weight of polyorganosiloxane C capable of crosslinking via polycondensation to an elastomer.

Thus the composition according to the invention may comprise at least one adhesion promoter E such as, for example, the organosilicon compounds bearing both:
(1) one or more hydrolyzable groups bonded to the silicon atom, and
(2) one or more organic groups substituted with radicals comprising a nitrogen atom or chosen from the group of (meth)acrylate, epoxy and alkenyl radicals, and more preferably still from the group constituted by the following compounds, taken alone or as a mixture:
vinyltrimethoxysilane (VTMO);
3-glycidoxypropyltrimethoxysilane (GLYMO);
methacryloxypropyltrimethoxysilane (MEMO);
[H$_2$N(CH$_2$)$_3$]Si(OCH$_2$CH$_2$CH$_3$)$_3$;
[H$_2$N(CH$_2$)$_3$]Si(OCH$_3$)$_3$;
[H$_2$N(CH$_2$)$_3$]Si(OC$_2$H$_5$)$_3$;
[H$_2$N(CH$_2$)$_4$]Si(OCH$_3$)$_3$;
[H$_2$NCH$_2$CH(CH$_3$)CH$_2$CH$_2$]SiCH$_3$(OCH$_3$)$_2$;
[H$_2$NCH$_2$]Si(OCH$_3$)$_3$;
[n-C$_4$H$_9$—HN—CH$_2$]Si(OCH$_3$)$_3$;
[H$_2$N(CH$_2$)$_2$NH(CH$_2$)$_3$]Si(OCH$_3$)$_3$;
[H$_2$N(CH$_2$)$_2$NH(CH$_2$)$_3$]Si(OCH$_2$CH$_2$OCH$_3$)$_3$;
[CH$_3$NH(CH$_2$)$_2$NH(CH$_2$)$_3$]Si(OCH$_3$)$_3$;
[H(NHCH$_2$CH$_2$)$_2$NH(CH$_2$)$_3$]Si(OCH$_3$)$_3$;

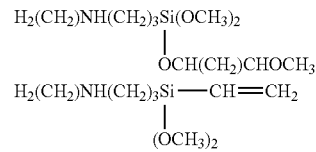

or polyorganosiloxane oligomers containing such organic groups at a content greater than 20%.

For the single-component and two-component bases, use is made, as the mineral fillers F, of very finely divided products, the average particle diameter of which is less than 0.1 μm. These fillers include fumed silicas and precipitated silicas; their BET specific surface area is generally greater than 40 m²/g. These fillers may also be in the form of more coarsely divided products, having an average particle diameter greater than 0.1 μm. As examples of such fillers, mention may be made of ground quartz, diatomaceous silicas, calcium carbonate, calcined clay, rutile-type titanium oxide, iron, zinc, chromium, zirconium or magnesium oxides, the various forms of alumina (hydrated or unhydrated), boron nitride, lithopone, barium metaborate, barium sulfate and glass microbeads; their specific surface area is generally less than 30 m²/g.

These fillers may have been surface-modified by treatment with the various organosilicon compounds customarily employed for this purpose. Thus, these organosilicon compounds may be organochlorosilanes, diorganocyclopolysiloxanes, hexaorganodisiloxanes, hexaorganodisilazanes or diorganocyclopolysilazanes (French patents FR-A-1 126 884, FR-A-1 136 885 and FR-A-1 236 505, and British patent GB-A-1 024 234). The treated fillers contain, in most cases, from 3 to 30% of their weight of organosilicon compounds. The fillers may be constituted of a mixture of several types of fillers of different particle size; thus, for example, they may be constituted of 30 to 70% of finely divided silicas with a BET specific surface area greater than 40 m$^2$/g and of 70 to 30% of more coarsely divided silicas with a specific surface area less than 30 m$^2$/g.

The purpose of introducing fillers is to give good mechanical and rheological properties to the elastomers that result from the curing of the compositions according to the invention.

In combination with these fillers, use may be made of mineral and/or organic pigments and also agents that improve the thermal resistance (salts and oxides of rare-earth elements such as ceric oxides and hydroxides) and/or the fire resistance of the elastomers. For example, it is possible to use the cocktails of oxides described in international application WO 98/29488. Mention may be made, among the agents for improving the fire resistance, of halogenated organic derivatives, organic phosphorus derivatives, platinum derivatives, such as chloroplatinic acid (its reaction products with alkanols or ethers), or platinous chloride-olefin complexes. These pigments and agents together represent at most 20% of the weight of the fillers.

Other customary auxiliary agents and additives may be incorporated into the composition according to the invention; these are chosen as a function of the applications in which said compositions are used.

The silicone base used to produce the composition according to the invention may comprise:

100 parts of polyorganosiloxane oil C capable of crosslinking via polycondensation into an elastomer;

0 to 20 parts of a crosslinking agent D;

0 to 20 parts of an adhesion promoter E; and 0 to 50 parts of filler F.

In addition to the main constituents, nonreactive linear polyorganosiloxane polymers G may be introduced with the intention of acting on the physical characteristics of the compositions in accordance with the invention and/or on the mechanical properties of the elastomers resulting from the curing of these compositions.

These nonreactive linear polyorganosiloxane polymers G are well known; they comprise more especially: α,ω-bis(triorganosiloxy)diorganopolysiloxane polymers with viscosities of at least 10 mPa·s at 25° C. formed essentially of diorganosiloxy units and of at least 1% of monoorganosiloxy and/or siloxy units, the organic radicals bonded to the silicon atoms being chosen from the methyl, vinyl and phenyl radicals, 60% at least of these organic radicals being methyl radicals and 10% at most being vinyl radicals. The viscosity of these polymers can reach several tens of millions of mPa·s at 25° C.; they therefore include oils with a fluid to viscous appearance and soft to hard gums. They are prepared according to the usual techniques described more specifically in French patents FR-A-978 058, FR-A-1 025 150, FR-A-1 108 764 and FR-A-1 370 884. Use is preferably made of α,ω-bis(trimethylsiloxy)dimethylpolysiloxane oils with a viscosity ranging from 10 mPa·s to 1000 mPa·s at 25° C. These polymers, which act as plasticizers, can be introduced in a proportion of at most 70 parts, preferably of 5 to 20 parts, per 100 parts of the polyorganosiloxane oil C capable of crosslinking via polycondensation.

The compositions according to the invention can in addition advantageously comprise at least one silicone resin H. These silicone resins are branched organopolysiloxane polymers which are well known and which are available commercially. They have, per molecule, at least two different units chosen from those of formula R'''$_3$SiO$_{1/2}$ (M unit), R'''$_2$SiO$_{2/2}$ (D unit), R'''SiO$_{3/2}$ (T unit) and SiO$_{4/2}$ (Q unit). The R''' radicals are identical or different and are chosen from linear or branched alkyl radicals or vinyl, phenyl or 3,3,3-trifluoropropyl radicals. Preferably, the alkyl radicals have from 1 to 6 carbon atoms inclusive. More particularly, mention may be made, as alkyl R radicals, of methyl, ethyl, isopropyl, tert-butyl and n-hexyl radicals. These resins are preferably hydroxylated and have, in this case, a weight content of hydroxyl groups of between 5 and 500 meq/100 g.

Mention may be made, as examples of resins, of MQ resins, MDQ resins, TD resins and MDT resins.

In order to manufacture the compositions according to the invention it is necessary, in the case of the single-component compositions, to use equipment that makes it possible to intimately mix the various fundamental constituents in a moisture-free environment, with or without a supply of heat, optionally added to which constituents are the aforementioned adjuvants and additives. All these ingredients may be loaded into the equipment in any order of introduction. Thus, it is possible to firstly mix the organopolysiloxane oils C and the fillers F and then to add to the paste obtained the crosslinkers D, the compounds E and the catalyst according to the invention. It is also possible to mix the oils C, the crosslinkers D, the compounds E and the fillers F and to subsequently add the catalyst according to the invention. During these operations, the mixtures may be heated at a temperature within the range of 50-180° C. under atmospheric pressure or under a reduced pressure in order to promote the removal of volatile materials.

The single-component compositions according to the invention, used as they are, that is to say undiluted, or in the form of dispersions in diluents, are stable during storage in the absence of water and cure at low temperatures (after removal of solvents in the case of dispersions) in the presence of water to form elastomers.

After the deposition of the compositions as they are, onto solid substrates, in a humid atmosphere, it is observed that a process of curing into elastomers occurs, it takes place from the outside to the inside of the mass deposited. A skin forms first at the surface, then the crosslinking continues in depth. The complete formation of the skin, which results in a tack-free feel of the surface, requires a period of time of a few minutes; this period of time depends on the degree of relative humidity of the atmosphere surrounding the compositions and on the crosslinkability of the latter.

Furthermore, the in-depth curing of the deposited layers, which must be sufficient to allow the demolding and handling of the elastomers formed, requires a longer period of time.

Indeed, this period of time depends not only on the factors mentioned above for the formation of the tack-free feel but also on the thickness of the deposited layers, which thickness generally lies between 0.5 mm and several centimeters. The single-component compositions may be used for multiple applications such as jointing in the construction industry, assembling the most diverse materials (metals, plastics, natural and synthetic rubbers, wood, board, earthenware, brick, ceramic, glass, stone, concrete, masonry units), insulating electrical conductors, the potting of electronic circuits, or the preparation of molds used for manufacturing articles made of synthetic resins or foams.

The manufacture of the two-component compositions according to the invention is also carried out by mixing various constituents in suitable equipment. In order to obtain homogeneous compositions, it is preferable to firstly mix the polymers A with the fillers C; the whole mixture may be heated for at least 30 minutes at a temperature above 80° C., so as to complete the wetting of the fillers by the oils. To the mixture obtained, preferably brought to a temperature below 80° C., for example of around room temperature, may be added the other constituents, that is to say the crosslinking agents, the catalyst and optionally various additives and adjuvants and even water.

The compositions in accordance with the invention may be employed for multiple applications, such as jointing and/or bonding in the construction industry or the transportation industry (e.g.: automobile, aerospace, railroad, maritime and aeronautical industries), assembling the most diverse materials (metals, plastics, natural and synthetic rubbers, wood, boards, polycarbonate, earthenware, brick, ceramic, glass, stone, concrete and masonry units), insulating electrical conductors, the potting of electronic circuits, and the preparation of molds used for manufacturing articles made of synthetic resins or foams.

Thus, another subject of the invention consists of a two-component system that is a precursor of the organopolysiloxane composition according to the invention and as defined that can be vulcanized to a silicone elastomer via polycondensation reactions, characterized in that it is in two separate parts P1 and P2 intended to be mixed in order to form said composition, and in that one of these parts comprises:

the catalyst system X according to the invention and as defined above as a catalyst for the polycondensation reaction of organopolysiloxanes, and the crosslinking agent D or the polyorganosiloxane oil(s) C capable of crosslinking via polycondensation into an elastomer, whilst the other part is free of the aforementioned species.

Another subject of the invention also consists of a single-component polyorganosiloxane composition that is stable during storage in the absence of moisture and that crosslinks, in the presence of water, into an elastomer, characterized in that it comprises:

at least one crosslinkable linear polyorganopolysiloxane that has functionalized ends of alkoxy, oxime, acyl and/ or enoxy type, preferably alkoxy type;

a filler; and the catalyst system X according to the invention and as defined above.

One organopolysiloxane composition according to the invention that is particularly advantageous and that can be vulcanized to a silicone elastomer via polycondensation reactions comprises:

(a) a silicone base B comprising:

per 100 parts by weight of at least one polyorganosiloxane oil C capable of crosslinking via polycondensation, which is a reactive α,ω-dihydroxydiorganopolysiloxane polymer, the organic radicals of which are hydrocarbon-based radicals, preferably chosen from the group constituted by: alkyls having from 1 to 20 carbon atoms; cycloalkyls having from 3 to 8 carbon atoms; alkenyls having from 2 to 8 carbon atoms and cycloalkenyls having from 5 to 8 carbon atoms;

from 0.1 to 60 parts by weight of at least one crosslinking agent D chosen from the group constituted by: polyalkoxysilanes, products originating from the partial hydrolysis of a polyalkoxysilane, and polyalkoxysiloxanes;

from 0 to 60 parts by weight of an adhesion promoter E as described above;

from 0 to 250 parts by weight, preferably from 5 to 200 parts by weight, of at least one siliceous, organic and/or non-siliceous mineral filler F;

from 0.001 to 10 parts by weight of water;

from 0 to 100 parts by weight of at least one nonreactive linear polyorganosiloxane polymer G consisting of a linear homopolymer or copolymer, of which, per molecule, the monovalent organic substituents, which are identical to or different from one another and which are bonded to the silicon atoms, are chosen from alkyl, cycloalkyl, alkenyl, aryl, alkylarylene and arylalkylene radicals;

from 0 to 70 parts by weight of polyorganosiloxane resins H;

from 0 to 20 parts by weight of a coloring base or of a coloring agent I; and from 0 to 20 parts of auxiliary additives J known to a person skilled in the art, such as plasticizers, crosslinking retardants, mineral oils, antimicrobial agents or heat stabilizers, such as titanium, iron or cerium oxides; and (b) from 0.1 to 50 parts by weight of the catalyst system X according to the invention and as defined above.

The two-component compositions according to the invention can be shaped, extruded or in particular molded following various shapes and then be cured at room temperature to give an elastomer.

In addition, they are suitable for the formation of "in situ" seals used in the motor vehicle industry. These "in situ" seals encompass several types, namely "flattened" seals (known as "flowed gasket" seals), "shaped" seals (known as "profiled" seals) and "injection-molded" seals.

The "flattened" seals are formed following the application of a pasty bead of the compositions to the region of contact between 2 metal or plastic components to be assembled. The pasty bead is first deposited on one of the components and then the other component is immediately applied to the first; this results in flattening of the bead before it is converted into elastomer. Seals of this type are aimed at assemblages which do not have to be taken apart in common practice (oil sump seals, timing case seals, etc.).

The "shaped" seals are also obtained following the application of a pasty bead of the compositions to the region of contact between 2 components to be assembled. However, after the deposition of the pasty bead on one of the components, the bead is given time to completely cure to give an elastomer and only at this moment is the second component applied to the first.

Furthermore, the seals, due to their rubbery or fluid natures, match all the unevennesses of the surfaces to have seals formed on them; for this reason, it is pointless:

(1) to carefully machine the metal surfaces which have to be brought into contact with one another, and (2) to forcibly tighten the assemblages obtained; these distinguishing features make it possible, to a certain extent, to dispense with fastening seals, spacers or ribs usually intended to stiffen and reinforce the components of the assemblages.

As the compositions in accordance with the invention cure rapidly at room temperature and even in an enclosed environment, the result of this is that the "shaped" seals (and also the other "in situ" seals) resulting from the curing of these compositions are self-adhesive and can easily be manufactured under industrial conditions. For example, they can be manufactured on the normal assembly lines of the motor vehicle industry equipped with an automatic device for the deposition of the compositions. This automatic device very often has a mixing head and a depositing nozzle, the latter moving along according to the outline of the seals to be manufactured.

The compositions manufactured and distributed by means of this device have to have a curing time which is properly adjusted in order, on the one hand, to avoid the compositions from setting solid in the mixing head and, on the other hand, to obtain complete crosslinking after the end of the deposition of the pasty bead on the components on which seals are to be formed. These "shaped" seals are more especially suitable for cylinder head cover seals, gearbox case cover seals, timing spacer seals and even oil sump seals.

The injection-molded seals are formed in an enclosed environment, in cavities which are often completely closed; the compositions placed in these cavities are rapidly converted to elastomers. These seals can, for example, ensure the leak-tightness of crankshaft bearings.

The compositions in accordance with the invention are also suitable for the formation of rapidly curing and self-adhesive seals and/or adhesives in other fields than the motor vehicle industry. Thus, they can be used to adhesively bond and to form seals with regard to plastic switch cabinets, to produce seals and/or adhesives:

for domestic electrical appliances, in particular for assembling components such as the glass and metal walls of ovens, vacuum cleaner and iron components;

for electronic housings, for example used in the motor vehicle industry (examples: brake power distributor, etc.); and for the assembling, adhesive bonding, forming a seal on a tank, for example in the motor vehicle industry.

The compositions in accordance with the invention are very particularly suitable for the formation of seals in an enclosed environment liable to be subjected to a heat treatment due to the type of application, for example for seals used to adhesively bond the components in domestic electrical appliances such as baking ovens. This is because, in some applications, the seal has to withstand temperatures of greater than or equal to 100° C. while maintaining an adhesion in accordance with the requirements of the application.

Another subject of the invention relates to a self-adhesive seal and/or an adhesive, prepared by curing, at ambient temperature:

of an organopolysiloxane composition according to the invention, or of an organopolysiloxane composition resulting from the mixing of the parts P1 and P2 of the two-component system as defined above.

The final subject of the invention consists of an elastomer that has good heat resistance and is obtained by crosslinking and curing of the two-component system according to the invention and as described above, or of the composition according to the invention and as described above.

Other advantages and features of the present invention will appear on reading the following examples that are given by way of illustration and that are in no way limiting.

EXAMPLES

Examples 1 to 4

1) Preparation of the Catalyst System According to the Invention

The complex [Zn(t-Bu-acac)$_2$] was dispersed at a concentration of 6.1% or 10% in two silicone oils with different viscosities:

a1: hydroxylated polydimethylsiloxane oil blocked at each of the chain ends by a $(CH_3)_2(OH)SiO_{0.5}$ unit, having a viscosity of 14 000 mPa·s at 25° C.

a4: polydimethylsiloxane oil blocked at each of the chain ends by a $(CH_3)_3SiO_{0.5}$ unit, having a viscosity of 50 mPa·s at 25° C.

The mixtures were then finely milled by means of a 3-roll mill, the clamping pressures of which, between the rolls, were adjusted so as to result, if possible, in homogeneous mixtures. The catalyst systems thus obtained were characterized from the point of view of their appearance and by a viscosity measurement on a Brookfield machine:

TABLE 1

| | | Catalyst system d1 | Catalyst system d2 | Comparative example d3 |
|---|---|---|---|---|
| Dilution in a silicone oil % by weight | | 6.09% in a1 | 10% in a1 | 6.09% in a4 |
| Appearance | | Homogeneous | Homogeneous | Heterogeneous suspension that settles |
| Brookfield viscosity (cps) 23° C., spindle No. 7 Variable speed: V | V = 0.5 | 80 000 | 200 000 | / |
| | V = 1 | 72 000 | 160 000 | / |
| | v = 2.5 | 70 000 | 120 000 | / |

The results from table 1 demonstrate the importance of using a silicone oil that has a viscosity of at least 100 mPa·s is important for obtaining homogeneous mixtures in order to be able to use the catalyst system according to the invention.

2) Silicone Composition that Crosslinks at Room Temperature Via a Polycondensation Reaction The two-component compositions detailed in tables 2 and 3 were prepared. The ingredients listed below are the constituents used for examples 1 to 4 and comparative examples 1 to 3:

a1: hydroxylated polydimethylsiloxane oil blocked at each of the chain ends by a $(CH_3)_2(OH)SiO_{0.5}$ unit, having a viscosity of 14 000 mPa·s at 25° C.;

a2: hydroxylated polydimethylsiloxane oil blocked at each of the chain ends by a $(CH_3)_2(OH)SiO_{0.5}$ unit, having a viscosity of 3500 mPa·s at 25° C.;

a3: hydroxylated polydimethylsiloxane oil blocked at each of the chain ends by a $(CH_3)_2(OH)SiO_{0.5}$ unit, having a viscosity of 750 mPa·s at 25° C.;

a4: hydroxylated polydimethylsiloxane oil blocked at each of the chain ends by a $(CH_3)_2(OH)SiO_{0.5}$ unit, having a viscosity of 50 mPa·s at 25° C.;

b1: fumed silica having a BET specific surface area of 200 $m^2/g$;

b2: ground quartz having a mean particle diameter of 10 μm;

b3: fumed silica having a BET specific surface area of 200 $m^2/g$, treated with HMDZ, dispersed in a mixture of a1 and of a polydimethylsiloxane oil blocked at each of the chain ends by a $(CH_3)_3SiO_{0.5}$ unit;

c: water;

d1: Catalyst system X according to the invention: $[Zn(t\text{-}Bu\text{-}acac)_2]$ dispersed at a concentration of 6% in a1 and prepared according to the procedure described in paragraph 1) above.

d2: Catalyst system X according to the invention: $[Zn(t\text{-}Bu\text{-}acac)_2]$ dispersed at a concentration of 10% in a1 and prepared according to the procedure described in paragraph 1) above.

d4: $[Zn(t\text{-}Bu\text{-}acac)_2]$ diluted to a concentration of 37.4% in an organic solvent (ethyl acetate);

d5: Fomrez® catalyst UL-28: dimethylbis[(1-oxoneodecyl)oxy]stannane=$[C_9H_{19}COO]_2Sn(Me)_2$ d6: tin-silicon compound which is the reaction product of $Si(OC_2H_5)_4$ and of dibutyltin diacetate (DBTDA) of formula: $[CH_3(CH_2)_3]_2Sn[OCOCH_3]_2$ (reaction temperature=130° C.);

e: ethyl polysilicate;

f: organoaminosilane compound of formula: $H_2N(CH_2)_2NH(CH_2)_3Si(OCH_3)_3$.

TABLE 2

Non self-adhesive RTV2 compositions (parts by weight)

| Ingredients | Example 1 | Comparative example 1 | Example 2 | Comparative example 2 | Example 3 |
|---|---|---|---|---|---|
| a1 | 2.36 | 4.75 | 2.11 | 20 | 9.56 |
| a3 | | | 1 | 1 | |
| b2 | | | 18 | 18 | 18 |
| b3 | | | 60.2 | 60.2 | 60.2 |
| c | | | 0.1 | 0.1 | 0.0 |
| d1 (Invention) | 2.53 (1 eq Zn) | | 19.04 | | |
| d2 (Invention) | | | | | 11.6 |
| d4 (Comparative example) | | 0.532 (1.2 eq Zn) | | | |
| d5 (Comparative example) | | | | 0.44 | |
| e | 0.28 | 0.24 | 3.0 | 1.5 | 3.0 |

TABLE 3

Self-adhesive RTV2 compositions (parts by weight)

| Ingredients | Example 4 | Comparative example 3 |
|---|---|---|
| a2 | 50.98 | 50.98 |
| a4 | 0 | 1.5 |
| b1 | 6.63 | 6.63 |
| b2 | 42.32 | 42.32 |
| c | 0.075 | 0.075 |
| d1 (invention) | 7.15 | |
| d6 (comparative example) | | 0.471 |
| e | 10 | 0.67 |
| f | 1.71 | 1.71 |

4) Tests on the Non Self-Adhesive Compositions

The results from Table 4, in particular example 1 and comparative example 1, highlight the effectiveness of the process for preparing the catalyst system claimed. Furthermore, examples 2 and 3 demonstrate the advantage of using this catalyst system for obtaining elastomers that do not contain toxic products and that have a potlife suitable for the application (that is to say a pot-life that is long enough to allow it to be used, but short enough to obtain an article that can be handled at the latest after 24 h at 23° C.).

TABLE 4

Crosslinking kinetics (Pot-life and Shore A hardness acquisition kinetics)

|  | Example 1 | Comparative example 1 | Example 2 | Example 3 |
|---|---|---|---|---|
| Pot-life (min.) | 9 min | 30 min | 60 min | 7 min |
| SAH after 24 h at 23° C. (top/bottom) | 21/10 | 19/11 | 9/16 | 16/16 |
| SAH after 4 days at 23° C. (bottom) | 23 | 22 | 21 | 22 |
| Appearance of the crosslinked slug | Homogeneous | Heterogeneous | Homogeneous | Homogeneous |

Shore A hardness, denoted by SAH: Measurements carried out according to the instructions of the ASTM-D2240 standard).

The results from Table 5 show that the elastomer obtained has good mechanical properties, similar to those obtained with a tin-based catalyst.

TABLE 5

Mechanical properties

| | Mechanical properties | | | |
|---|---|---|---|---|
| | SAH 4 days (bottom) | Tear strength (N/mm) | TS (MPa) | EB (%) |
| Example 3 | 22 | 21 | 3.1 | 370 |
| Comparative example 2 | 22 | 20 | 3.5 | 400 |

EB = elongation at break (%, measurements carried out according to the instructions of the ASTM-D412 or AFNOR-T-46002 standard).
TS = tensile strength (MPa, measurements carried out according to the instructions of the ASTM-D412 or AFNOR-T-46002 standard).

TABLE 6

Properties after heat treatment at 150° C. and 220° C.

| Heat treatment time (h) | Comparative example 2 SAH at 150° C. | Comparative example 2 SAH at 220° C. | Example 3 SAH at 150° C. | Example 3 SAH at 220° C. |
|---|---|---|---|---|
| 0 | 23 | 23 | 23 | 23 |
| 7 | 18 | 18 | 24 | 22 |
| 14 | 14 | 23 | | |
| 21 | 16 | 25 | | |
| 45 | 16 | 28 | | |
| 47 | | | 23 | 22 |
| 69 | 16 | 28 | | |
| 71 | | | 23 | 21 |

Table 6 also highlights the very good heat resistance of the elastomers crosslinked in the presence of the catalyst system claimed: indeed, the Shore A hardness (SAH) of these elastomers remains constant after a heat treatment at 150° C. and 220° C., unlike the elastomers catalyzed by tin complexes (loss of SAH at 150° C. or reduction followed by high increase at 220° C.) which exhibit a great variation in the SAH. Specifically, comparative example 2 at 150° C. reveals an elastomer for which the SAH changes from 23 to 14 after a heat treatment of 14 h and which has cured to achieve an SAH of 16 after 45 h. The same comparative example 2 but at 220° C. reveals an elastomer which this time sees its SAH hardness change from 23 to 28 after a heat treatment of 45 h. It is clear that these variations in hardness are detrimental for any application requiring a good heat resistance but also stable behavior of the elastomer being subjected to this type of stress.

5) Tests on the Self-Adhesive Compositions

The results from tables 7 and 8 demonstrate the effectiveness of the catalyst system for obtaining an RTV composition that has a rapid curing time and good adhesion to various supports. The adhesion properties of the compositions were measured by producing adhesive bonds between dissimilar materials (MNRPS-748 standard, 1 mm thick seal) using glass/stainless steel.

The kinetics and adhesion results are presented in tables 7 and 8.

TABLE 7

|  | Example 4 | Comparative example 3 |
|---|---|---|
| Pot-life (min.) | 5 min | 3 min |
| SAH after 60 min at 23° C. | 16 | 15 |
| SAH after 24 h at 23° C. | 43 | / |
| SAH after 6-7 days at 23° C. | 54 | 52 |

TABLE 8

| Adhesion test after 7 days at 23° C. | Example 5 |
|---|---|
| Tensile strength (MPa) | 1.6 |
| Type of failure (% cohesive failure) | 75 |

Tensile strength: measurements carried out according to the instructions of the MNRPS-748 standard);
Cohesive failure: measurements carried out according to the instructions of the MNRPS-748 standard).

All of these results show that the catalyst system according to the invention results in elastomers being obtained that have properties equivalent to or superior to the control, in particular as regards the heat resistance properties (no change in SAH after a long-duration heat treatment at 220° C.), accompanied by very rapid kinetics that are compatible with industrial production rates. This catalyst system is also compatible with the adhesion promoters contained in certain self-adhesive RTV compositions.

The invention claimed is:
1. An RTV-organopolysiloxane composition comprising a silicone base B capable of curing via polycondensation reac- tion into a silicone elastomer and a catalytically effective amount of at least one catalyst system X consisting of a milled homogeneous dispersion of:
(a) at least one metal complex or salt A of formula (1):

$$[Zn(L^1)_{r1}(L^2)_{r2}(Y)_x] \quad (1)$$

in which:
r1=1 or 2, r2=0 or 1 and x=0 or 1;
the symbol $L^1$ is a ligand which is a β-dicarbonylato anion or the enolate anion of a β-dicarbonyl-containing compound and, when r1=2, the symbols $L^1$ are identical or different,
the symbol $L^2$ is an anionic ligand which is different from $L^1$ and
the symbol Y is a neutral ligand, and
(b) at least one oily organopolysiloxane polymer having a viscosity of at least 100 mPa·s,
wherein said at least one metal complex or salt A of formula (1) is in a solid form within said dispersion.

2. The RTV-organopolysiloxane composition as defined by claim 1, wherein the milling is carried out by means of a 3-roll mill, for which the clamping pressures from the rolls are adjusted so as to result in a homogeneous mixture.

3. The RTV-organopolysiloxane composition as defined by claim 1, wherein the metal complex or salt A of formula (1) is selected from the group consisting of the complexes of formulae (3) to (6) below:

$$[Zn(t\text{-Bu-acac})_2] \text{ where } (t\text{-Bu-acac})= \text{the 2,2,6,6-tetramethyl-3,5-heptanedionato anion or the enolate anion of 2,2,6,6-tetramethyl-3,5-heptanedione;} \quad (3)$$

$$[Zn(2,4\text{-pentanedionato})_2]; \quad (4)$$

$$[Zn(3,5\text{-heptanedionato})_2]; \text{ and} \quad (5)$$

$$[Zn(2,6\text{-dimethyl-3,5heptanedionato})_2] \quad (6).$$

4. The RTV-organopolysiloxane composition as defined by claim 1, wherein the β-dicarbonylato ligand $L^1$ is a β-diketonato anion derived from a β-diketone or a β-ketoesterato anion derived from a β-keto ester of the following formula:

$$R^1COCHR^2COR^3 \quad (7)$$

in which:
$R^1$ is a substituted or unsubstituted, linear or branched $C_1$-$C_{30}$ hydrocarbon-based radical or a substituted or unsubstituted aromatic radical;
$R^2$ is a hydrogen or a hydrocarbon-based radical having at most 4 carbon atoms;
$R^3$ is a substituted or unsubstituted, linear, cyclic or branched $C_1$-$C_{30}$ hydrocarbon-based radical, a substituted or unsubstituted aromatic radical, or an —$OR^4$ radical wherein $R^4$ is a substituted or unsubstituted, linear, cyclic or branched $C_1$-$C_{30}$ hydrocarbon-based radical, with the proviso that:
$R^1$ and $R^2$ may be joined together to form a ring member, and
$R^2$ and $R^4$ may be joined together to form a ring member.

5. The RTV-organopolysiloxane composition as defined by claim 4, wherein the β-diketone of formula (7) is selected from the group consisting of the following β-diketones: 2,4-pentanedione (acac); 2,4-hexanedione; 2,4-heptanedione; 3,5-heptanedione; 3-ethyl-2,4-pentanedione; 5-methyl-2,4-hexanedione; 2,4-octanedione; 3,5-octanedione; 5,5-dimethyl-2,4-hexanedione; 6-methyl-2,4-heptanedione, 2,2-dimethyl-3,5-nonanedione; 2,6-dimethyl-3,5-heptanedione; 2-acetylcyclohexanone (Cy-acac); 2,2,6,6-tetramethyl-3,5-heptanedione (t-Bu-acac); 1,1,1,5,5,5-hexafluoro-2,4-pentanedione (F-acac); benzoylacetone; dibenzoylmethane; 3-methyl-2,4-pentadione; 3-acetyl-2-pentanone; 3-acetyl-2-hexanone; 3-acetyl-2-heptanone; 3-acetyl-5-methyl-2-hexanone; stearoyl benzoyl methane; octanoyl benzoyl methane; 4-t-butyl-4'-methoxydibenzoylmethane; 4,4'-dimethoxydibenzoylmethane and 4,4'-di-tert-butyldibenzoylmethane.

6. The RTV-organopolysiloxane composition as defined by claim 1, wherein $L^2$ is an anionic ligand selected from the group consisting of the following anions: fluoro ($F^-$), chloro ($Cl^-$), triiodo ($I_3^-$), difluorochlorato [$ClF_2$]$^-$, hexafluoroiodato [$IF_6$]$^-$, oxochlorato ($ClO$)$^-$, dioxochlorato ($ClO_2$)$^-$, trioxochlorato ($ClO_3$)$^-$, tetraoxochlorato ($ClO_4$)$^-$, hydroxido ($OH$)$^-$, mercapto ($SH$)$^-$, selanido ($SeH$)$^-$, hyperoxo ($O_2$)$^-$, ozonido ($O_3$)$^-$, hydroxo ($OH^-$), hydrodisulfido ($HS_2$)$^-$, methoxo ($CH_3O$)$^-$, ethoxo ($C_2H_5O$)$^-$, propoxido ($C_3H_7O$)$^-$, methylthio ($CH_3S$)$^-$, ethanethiolato ($C_2H_5S$)$^-$, 2-chloroethanolato ($C_2H_4ClO$)$^-$, phenoxido ($C_6H_5O$)$^-$, phenylthio ($C_6H_5S$)$^-$, 4-nitrophenolato [$C_6H_4(NO_2)O$]$^-$, formato ($HCO_2$)$^-$, acetato ($CH_3CO_2$)$^-$, propionato ($CH_3CH_2CO_2$)$^-$, nitrido ($N_3$)$^-$, cyano ($CN$)$^-$, cyanato ($NCO$)$^-$, thiocyanato ($NCS$)$^-$, selenocyanato ($NCSe$)$^-$, amido ($NH_2$)$^-$, phosphino ($PH_2$)$^-$, chloroazanido ($ClHN$)$^-$, dichloroazanido ($Cl_2N$)$^-$, methanaminato ($CH_3NH$)$^-$, diazenido ($HN=N$)$^-$, diazanido ($H_2N—NH$)$^-$, diphosphenido ($HP=P$)$^-$, phosphonito ($H_2PO$)$^-$, phosphinato ($H_2PO_2$)$^-$, carboxylato, enolato, amides, alkylato and arylato.

7. The RTV-organopolysiloxane composition as defined by claim 1, wherein $L^2$ is an anionic ligand selected from the group consisting of the following anions: acetate, oxalate, propionate, butyrate, isobutyrate, diethylacetate, benzoate, 2-ethylhexanoate, stearate, methoxide, ethoxide, isopropoxide, tert-butoxide, tert-pentoxide, 8-hydroxyquinolinate, naphthenate and tropolonate.

8. The RTV-organopolysiloxane composition as defined by claim 1, wherein the silicone base B further comprises:
at least one polyorganosiloxane oil C capable of crosslinking via polycondensation into an elastomer;
optionally, at least one crosslinking agent D;
optionally, at least one adhesion promoter E; and
optionally, at least one siliceous, organic and/or non-siliceous mineral filler F.

9. A two-component system that is a precursor of the RTV-organopolysiloxane composition as defined by claim 8, which can be vulcanized to a silicone elastomer via polycondensation reactions and being in two separate parts P1 and P2 to be mixed to form said composition, and wherein one of these parts comprises:
the catalyst system X as a catalyst for the polycondensation reaction of organopolysiloxanes, and
the crosslinking agent D or the polyorganosiloxane oil(s) C capable of crosslinking via polycondensation into an elastomer, and
further wherein the other part is free of the aforesaid species.

10. An elastomer having good heat resistance obtained by crosslinking and curing of the two-component system as defined by claim 9.

11. A self-adhesive seal and/or adhesive comprising a cured RTV-organopolysiloxane composition resulting from the mixing of the parts P1 and P2 of the two-component system as defined by claim 9.

12. The RTV-organopolysiloxane composition as defined by claim 8, which can be vulcanized to a silicone elastomer via polycondensation reactions in which:
(a) the silicone base B comprises:
per 100 parts by weight of at least one polyorganosiloxane oil C capable of crosslinking via polycondensation, which is a reactive α,ω-dihydroxydiorganopolysiloxane polymer, the organic radicals of which are hydrocarbon-based radicals selected from the group consisting of alkyl radicals having from 1 to 20 carbon atoms; cycloalkyl radicals having from 3 to 8 carbon atoms; alkenyl radicals having from 2 to 8 carbon atoms and cycloalkenyl radicals having from 5 to 8 carbon atoms;

from 0.1 to 60 parts by weight of at least one crosslinking agent D selected from the group consisting of polyalkoxysilanes, products originating from the partial hydrolysis of a polyalkoxysilane, and polyalkoxysiloxanes;

from 0 to 60 parts by weight of an adhesion promoter E;

from 5 to 200 parts by weight of at least one siliceous, organic and/or non-siliceous mineral filler F;

from 0.001 to 10 parts by weight of water;

from 0 to 100 parts by weight of at least one nonreactive linear polyorganosiloxane polymer G comprising a linear homopolymer or copolymer, of which, per molecule, the monovalent organic substituents, which are identical to or different from one another and which are bonded to the silicon atoms, are selected from alkyl, cycloalkyl, alkenyl, aryl, alkylarylene and arylalkylene radicals;

from 0 to 20 parts by weight of a coloring base or of a coloring agent H;

from 0 to 70 parts by weight of polyorganosiloxane resins I; and from 0 to 20 parts of auxiliary additives J selected from among plasticizers, crosslinking retardants, mineral oils, antimicrobial agents or heat stabilizers, titanium, iron or cerium oxides; and (b) from 0.1 to 50 parts by weight of the catalyst system X.

13. A self-adhesive seal and/or adhesive comprising a cured RTV-organopolysiloxane composition as defined by claim 1.

14. An elastomer having good heat resistance obtained by crosslinking and curing of the RTV-organopolysiloxane composition as defined by claim 1.

15. The RTV-organopolysiloxane composition of claim 1, wherein said at least one oily organopolysiloxane polymer has a viscosity of at least 5000 mPa·s.

16. The RTV-organopolysiloxane composition of claim 1, wherein said at least one oily organopolysiloxane polymer has a viscosity of at least 10000 mPa·s.

17. The composition of claim 1, wherein said composition, upon crosslinking has a homogeneous appearance.

18. An RTV-organopolysiloxane composition comprising a silicone base B capable of curing via polycondensation reaction into a silicone elastomer and a catalytically effective amount of at least one catalyst system X consisting of a milled homogeneous dispersion of:

(a) at least one metal complex or salt A of formula (2) below:

$$[Zn(L^1)_{r1}(L^2)_{r2}] \quad (2)$$

in which:
r1=1 and r2=1;
the symbol $L^1$ is a ligand which is a β-dicarbonylato anion or the enolate anion of a β-dicarbonyl-containing compound, and
the symbol $L^2$ is an anionic ligand which is different from $L^1$, and (b) at least one oily organopolysiloxane polymer having a viscosity of at least 100 mPa·s,
wherein said at least one metal complex or salt A of formula (1) is in a solid form within said dispersion.

19. A single-component polyorganosiloxane composition that is stable during storage in the absence of moisture and that crosslinks, in the presence of water, into an elastomer, which comprises:

at least one crosslinkable linear polyorganopolysiloxane that has functionalized alkoxy, oxime, acyl and/or enoxy ends, a filler; and a catalyst system X consisting of a milled homogeneous dispersion of:
(a) at least one metal complex or salt A of formula (1):

$$[Zn(L^1)_{r1}(L^2)_{r2}(Y)_x] \quad (1)$$

in which:
r1=1 or 2, r2=0 or 1 and x=0 or 1;
the symbol $L^1$ is a ligand which is a β-dicarbonylato anion or the enolate anion of a β-dicarbonyl-containing compound and, when r1=2, the symbols $L^1$ are identical or different,
the symbol $L^2$ is an anionic ligand which is different from $L^1$ and
the symbol Y is a neutral ligand, and (b) at least one oily organopolysiloxane polymer having a viscosity of at least 100 mPa·s;
wherein said at least one metal complex or salt A of formula (1) is in a solid form within said dispersion.

20. An elastomer having good heat resistance obtained by crosslinking and curing of the RTV-organopolysiloxane composition as defined by claim 19.

21. A catalyst system X consisting of a milled homogeneous dispersion of:

a) at least one metal complex or salt A of formula (1) below:

$$[Zn(L^1)_{r1}(L^2)_{r2}(Y)_x] \quad (1)$$

in which:
r1=1, and r2=0 and x=1, or r2=1 and x=0;
the symbol $L^1$ is a ligand which is a β-dicarbonylato anion or the enolate anion of a β-dicarbonyl-containing compound,
the symbol $L^2$ is an anionic ligand which is different from $L^1$, and
the symbol Y is a neutral ligand, and b) at least one oily organopolysiloxane polymer having a viscosity of at least 100 mPa·s,
wherein said at least one metal complex or salt A of formula (1) is in a solid form within said dispersion.

22. The catalyst system X as defined by claim 21, wherein said at least one metal complex or salt A of formula (1) has the formula (2):

$$[Zn(L^1)_{r1}(L^2)_{r2}] \quad (2)$$

in which:
r1=1 and r2=1;
the symbol $L^1$ is a ligand which is a β-dicarbonylato anion or the enolate anion of a β-dicarbonyl-containing compound, and
the symbol $L^2$ is an anionic ligand which is different from $L^1$.

23. A process for the catalytic polycondensation reaction of organopolysiloxanes, said process comprising reacting at least one polyorganosiloxane in the presence of the catalyst system X as defined by claim 22.

24. An RTV-organopolysiloxane composition comprising a silicone base B capable of curing via polycondensation reaction into a silicone elastomer and a catalytically effective amount of at least one catalyst system X consisting of a milled homogeneous dispersion of:

(a) at least one metal complex or salt A of formula (1) below:

 (1)

in which:
r1=1, r2=0 or 1 and x=0 or 1; and r1+r2+x=2
the symbol $L^1$ is a ligand which is a β-dicarbonylato anion or the enolate anion of a β-dicarbonyl-containing compound,
the symbol $L^2$ is an anionic ligand which is different from $L^1$ and
the symbol Y is a neutral ligand, and
(b) at least one oily organopolysiloxane polymer having a viscosity of at least 100 mPa·s,
wherein said at least one metal complex or salt A of formula (1) is in a solid form within said dispersion.

* * * * *